(12) United States Patent
Suzuki et al.

(10) Patent No.: US 7,726,801 B2
(45) Date of Patent: Jun. 1, 2010

(54) METHOD OF INK-JET TEXTILE PRINTING

(75) Inventors: Shinichi Suzuki, Saitama (JP); Naoko Nakajima, Hino (JP); Kei Kudo, Hachioji (JP); Hitoshi Morimoto, Hachioji (JP); Yoshinori Tsubaki, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 672 days.

(21) Appl. No.: 11/601,887

(22) Filed: Nov. 20, 2006

(65) Prior Publication Data

US 2007/0126831 A1    Jun. 7, 2007

(30) Foreign Application Priority Data

Dec. 1, 2005    (JP) ............................. 2005-347724

(51) Int. Cl.
*G01D 11/00* (2006.01)
(52) U.S. Cl. .......................... 347/100; 347/95; 347/102
(58) Field of Classification Search ................. 347/100, 347/101, 102, 95, 96; 106/31.6, 31.27, 31.13; 523/160
See application file for complete search history.

(56) References Cited

U.S. PATENT DOCUMENTS

| 3,072,485 | A | * | 1/1963 | Reynolds et al. | ............. | 522/149 |
| 5,537,137 | A | * | 7/1996 | Held et al. | ................... | 347/102 |
| 5,866,296 | A | * | 2/1999 | Shibuya et al. | .............. | 430/195 |
| 5,994,033 | A | | 11/1999 | Davidon et al. | | |
| 6,838,132 | B1 | | 1/2005 | Iguchi et al. | | |
| 2003/0128264 | A1 | * | 7/2003 | Ishikawa et al. | ............. | 347/100 |

FOREIGN PATENT DOCUMENTS

| EP | 0 995 609 A1 | 4/2000 |
| EP | 0 997 508 A1 | 5/2000 |
| EP | 1 616 899 A1 | 1/2006 |
| EP | 1 702 961 A1 | 9/2006 |
| JP | 5-54667 B2 | 8/1993 |
| JP | 08-283636 A | 10/1996 |
| WO | WO 2005/012448 A2 | 2/2005 |

* cited by examiner

*Primary Examiner*—Manish S Shah
(74) *Attorney, Agent, or Firm*—Frishauf, Holtz, Goodman & Chick, P.C.

(57) ABSTRACT

A method for ink-jet textile printing including the steps of: (a) ejecting a pigment ink from a recording head onto a fabric, wherein the pigment ink contains at least water, a pigment and a polymer, wherein the polymer has a plurality of said chains in a hydrophilic main chain and is capable of cross-linking between the side chains by irradiation of active energy rays, and (b) forming an image by irradiation of active energy rays onto the ink ejected areas.

7 Claims, No Drawings

METHOD OF INK-JET TEXTILE PRINTING

This application is based on Japanese Patent Application No. 2005-347724 filed on Dec. 1, 2005, in Japanese Patent Office, the entire content of which is hereby incorporated by reference.

FIELD OF THE INVENTION

This invention relates to a method of ink-jet textile printing, with which a high quality textile printing image is obtained as well as an excellent bleeding resistance.

BACKGROUND OF THE INVENTION

In recent years, technology development to expand ink-jet recording in the textile printing field has been improved. For the ink employed in such ink-jet textile printing, various characteristics are required. In a fabric as the recording medium, desired characteristics are, for example, no bleeding, no color mixing of adjacent colors in multi-color printing, good drying properties, and superior durability after image fixing.

In ink-jet textile printing recording, bleeding resistance (reproducibility of thin lines), color bleeding (color mixing of different colors), and rear surface penetration occur due to printed inks onto a fabric, effective pretreatment of the fabric is essential to prevent these problems. The pretreatment process is, for example, usually conducted by application of a pretreatment agent such as a paste, water-soluble salt, or inorganic micro-particles onto the fabric employing a pad method, a coating method, or a spray method. However, such pretreatment process is complex, and a manufacturing process (being a cleaning process) in which such a pretreatment agent is removed is obviously needed after ink-jet printing, and further such a pretreatment process demands major investigational effort as a manufacturing process.

An ink-jet textile printing ink using a dye which is dissolved or dispersed in an aqueous medium is printed onto the fabric, after which the ink is fixed by heat and/or steam as a post-treatment process (being a coloring process), and this post-treatment process is also essential. However, desired is an ink-jet textile printing method which eliminates a post-treatment process.

In a textile printing method employing a pigment ink, the post-treatment process (being a coloring process) is not necessary, differing from the method employing a dye, and has become the desired textile printing method. For example, by blending a polymer into an ink, proposed has been enhancement of bleeding resistance and scratch resistance after heat fixing. (Please refer, for example, to Patent Document 1.) However, it is difficult to prevent bleeding and color bleeding, even though a pigment ink is employed, resulting in difficulty to obtain sufficient image quality without a pretreatment of woven the fabric.

An ink, curable with ultraviolet rays, is known as an ink-jet ink in which bleeding and color bleeding may not occur on a recording medium. (Please refer, for example, to Patent Document 2). As a material curable with ultraviolet rays, acrylate of tri-functional or more functional has been disclosed. Although bleeding and color bleeding are reduced to some degree by faster viscosity increase of the ink with ultraviolet curing, the ink penetrates to the rear surface of the fabric (also known as rear surface penetration) due to a non-water based solvent, resulting for example in a drawback of a density decrease. Further, even in cases when the ink does not exhibit rear surface penetration, emboss occurs on the printed surface of the fabric, because the major portion of the ink is a curable component, resulting in a printed material with a feeling of stiffness.

[Patent Document 1] Unexamined Japanese Patent Application Publication No. (hereinafter, referred to as JP-A) 8-283636

[Patent Document 2] Examined Japanese Patent Application Publication No. (hereinafter, referred to as JP-B) 5-54667

SUMMARY OF THE INVENTION

An object of the present invention is to provide a method of ink-jet textile printing, which exhibits suitability for fabrics without a pretreatment, bleeding resistance and color bleeding resistance, high image density, and no alternation of the texture of the fabric.

The above object of this invention is achievable by the following composition.

Item 1. A method for ink-jet textile printing comprising the steps of:

(a) ejecting a pigment ink from a recording head onto a fabric, wherein the pigment contains at least water, a pigment and a polymer, wherein the polymer has a plurality of side chains in a hydrophilic main chain and is capable of cross-linking between the side chains by irradiation of active energy rays, and (b) forming an image by irradiation of active energy rays onto the ink ejected area.

Item 2. The method for ink-jet textile printing of Item 1, wherein the fabric is not conducted with pretreatment.

Item 3. The method for ink-jet textile printing of Item 1, wherein the hydrophilic main chain of the polymer is a saponified polyvinyl acetate, and exhibits a polymerization degree of not less than 200 and not more than 2,000.

Item 4. The method for ink-jet textile printing of Item 1, wherein in the polymer, a modification rate of the side-chains to the hydrophilic main chain is not less than 0.3 mol % and not more than 4 mol %.

Item 5. The method for ink-jet textile printing of Item 1, wherein the contact angle of the pigment ink and the fabric is 40 to 100 degrees.

Item 6. The method for ink-jet textile printing of Item 1, wherein the pigment ink further is further comprising a photo-polymerization initiator in an amount of not less than 0.1 weight % and less than 1.0 weight % based on the total ink weight.

Item 7. The method for ink-jet textile printing of Item 1, wherein ultraviolet rays are irradiated after the pigment ink is adhered onto the fabric.

Item 8. The method for ink-jet textile printing of Item 1, wherein a heat-fixing process is conducted after the pigment ink is adhered onto the fabric.

According to the present invention, it is possible to provide a method of ink-jet textile printing, which exhibits suitability to fabrics without a pretreatment, bleeding resistance and color bleeding resistance, high image density, and no impairment to the texture of the fabric.

PREFERABLE EMBODIMENTS OF THIS INVENTION

It is to be understood that no single element of any of the embodiments described herein is absolutely essential, and that it is within the scope of this invention that one or more elements (or method steps) of one or more embodiments of the invention as described herein may be omitted or their functionality may be combined with that of other elements as a general matter of design choice.

The present invention prevents occurrence of bleeding (being reproducibility of thin lines) and color bleeding (being color mixing of different colors) by:

1) incorporating a polymer which has plural side-chains in the hydrophilic main chain and is capable of cross-linking among the side-chains with irradiation of active energy rays, in a pigment type ink (hereinafter, referred to simply as a pigment ink or an ink), 2) adhering the ink onto a fabric, and 3) viscosity increase (being gelation) of the ink itself as a curing reaction.

By the ink exhibiting the above characteristics, it becomes possible to effectively print onto fabric without pretreatment. Further, since the ink of this invention employs a pigment as a coloring agent, it is possible to print onto various kinds of fabric without a post-treatment process (being a coloring process) of a reactive dye, an acid dye and a disperse dye.

The present invention will be detailed below.

Active Energy Ray Cross-Linking Type Polymer

A polymer of this invention, which compound exhibits plural side-chains in a hydrophilic main chain and is capable of crosslinking among its side chains with irradiation of active energy rays, means a compound of at least one hydrophilic resin selected from the group of a saponified polyvinyl acetate, polyvinyl acetal, polyethylene oxide, polyalkylene oxide, polyvinyl pyrrolidone, polyacrylamide, polyacrylic acid, hydroxyethyl cellulose, methyl cellulose, hydroxypropyl cellulose, or a derivative of any of the above hydrophilic resin, and at least one copolymer of these resin, in the side-chains of which at least one modifying group selected from a photo-dimerization type, a photo-decomposition type, a photo-polymerization type, a photo-modification type or a photo-depolymerization type are introduced. Of these, a photo-polymerization type cross-linking group is preferable from the viewpoint of chemical sensitivity and characteristics of the formed image.

In a hydrophilic main chain, a saponified polyvinyl acetate is preferable from the viewpoint of ease of side-chain introduction and handling. The polymerization degree, determined with JIS K 6726, is preferably not less than 200 and not more than 4,000, and more preferably not less than 200 and not more than 2,000 from the viewpoint of handling. The modification rate of the side chains for the main chain is preferably not more than 0.3 mol % and not more than 4 mol %, and more preferably not less than 0.8 mol % and not more than 4 mol % from the viewpoint of chemical reactivity. In cases when it is less than 0.3 mol %, crosslinking is not sufficient, resulting in reduced effects of this invention, while when it is more than 4 mol %, cross-linking density is too great forming a hard and brittle film, resulting in low film strength.

Resin, in which introduced is a diazo group, a cinnamoyl group, a stilbazolium group or a styrylquinolium group as a modifying group of a photo-dimerization type, is preferred, and listed as examples are the photosensitive resins (compositions) described in JP-A 60-129742.

Photosensitive resins described in JP-A 60-129742 are compounds represented by following Formula (1), in which a stilbazolium group is introduced featuring a polyvinyl alcohol structure.

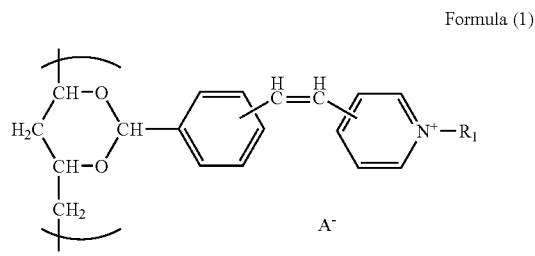

Formula (1)

In the formula, $R_1$ is an alkyl group of 1-4 carbon atoms, and $A^-$ is a counter anion.

Photosensitive resins described in JP-A 56-67309 are resin compositions provided with a 2-azide-5-nitrophenylcarbonyl oxyethylene structure represented by following Formula (2), or a 4-azide-3-nitrophenylcarbonyl oxyethylene structure represented by following Formula (3) in a polyvinyl alcohol structure.

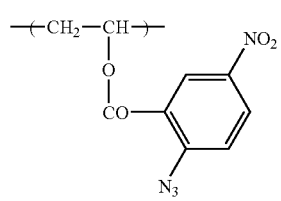

Formula (2)

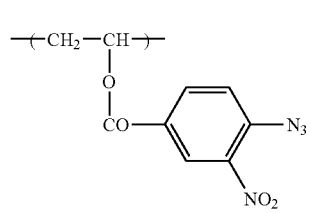

Formula (3)

Further, a modifying group represented by following Formula (4) is also preferably employed.

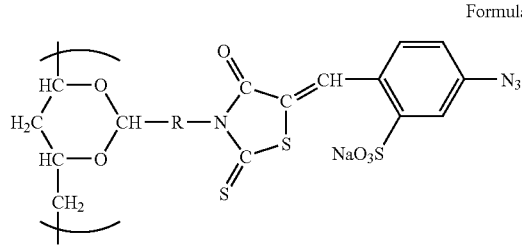

Formula (4)

In the formula, R is an alkylene group or an aromatic ring, but preferred is a benzene ring.

As a photo-polymerization type modifying group, resins described in JP-A Nos. 2000-181062 and 2004-189841, and represented by following Formula (5) are preferable from the viewpoint of reactivity.

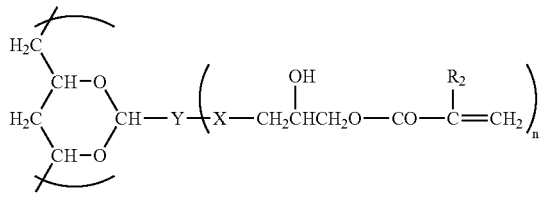

Formula (5)

In the formula, $R_2$ is Me or H, n is 1 or 2, X is $-(CH_2)_m-COO-$, $-CH_2-COO-$, or $-O-$, Y is an aromatic ring or a single bond, and m is an integer of 0-6.

Further, it is preferable that the photo-polymerization type modifying group described in JP-A 2004-161942 and represented by following Formula (6) is employed in the common water-soluble resin.

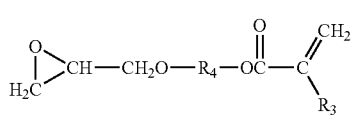

Formula (6)

In the formula, $R_3$ is Me or H, and $R_4$ is a straight-chain or a branched alkylene group of 2-10 carbon atoms.

This kind of an active energy ray cross-linking type resin is preferably incorporated in an amount of 0.8-5.0 weight % based on the total ink weight. In cases when the, resin exists in an amount of not less than 0.8 weight %, crosslinking efficiency is enhanced, and the almost instantaneous viscosity increase after cross-linking results in more preferable beading and color bleeding. If it is not more than 5.0 weight %, physical properties of ink and status in the ink head are barely affected, resulting in preferable ink ejection and ink storage stability.

Since the active energy ray cross-linking type resin of this invention cross-links among the side chains of a main chain exhibiting a certain type of polymerization in its nature through cross-linking bonds, the molecular weight increasing effect of a single photon is significantly large compared to the active energy ray cross-linking type resin which polymerizes through a common chain reaction. On the other hand, in a common active energy ray curable resin, the number of cross-linking points is not controllable, so that it is impossible to control physical properties of the film after curing, resulting in a hard and brittle film.

In the resin employed in this invention, the number of cross-linking points is totally controllable by adjustment of the length of the hydrophilic main chain and introduction of the side chains, whereby it is also possible to control physical properties of the ink film for differing functions.

Further, since a major portion of the common active energy ray curable ink, other than a coloring agent, is the curable component, the ink dots after curing are raised, resulting in deteriorated image quality, as typified by poor glossiness. However, in the resin of this invention, the required ink amount is relatively small and the amount of the drying components in the ink is relatively large, resulting in enhanced image quality and also image fixability after drying.

Photopolymerization Initiator and Sensitizing Agent

In this invention, it is preferable to add a photopolymerization initiator and a sensitizing agent. These additives may be added in the state of a solute dissolved in a solvent, or in a dispersed solution, or chemically bonded to the photosensitive resin. The added amount of a photopolymerization initiator is preferably not less than 0.1 weight % and not more than 1.0 weight % based on the total ink weight. In cases when it is more than 0.1 weight %, the cross-linking reaction by irradiation of active energy rays progresses sufficiently, and is preferable from the viewpoint of bleeding and color bleeding. Further, when a photopolymerization initiator is incorporated in an amount of less than 1.0 weight %, color fading over time of the residued initiator in printed areas on the fabric is small, which is preferable.

The photopolymerization initiator and the photosensitizing agent are not specifically limited, and common compounds of such may be employed.

Of these, water-soluble compounds are preferable from the viewpoint of the mixing characteristics and reaction efficiency. Specifically, 4-(2-hydroxyethoxy)phenyl-(2-hydroxy-2-propyl)ketone (being HMPK), thioxythanthone ammonium salt (being QTX), and benzophenone ammonium salt (also known as ABQ) are preferred from the viewpoint of the mixing characteristics in a water-based solvent.

Further, from the viewpoint of compatibility of the components, more preferable are 4-(2-hydroxyethoxy)phenyl-(2-hydroxy-2-propyl)ketone (being at n=2, and abbreviated as HMPK) and also its ethylene oxide adducts (at n=2-5), which are represented by following Formula (7).

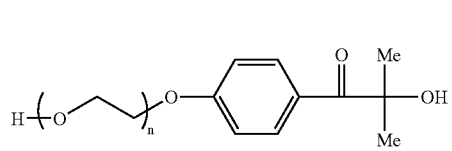

Formula (7)

In the formula, n is an integer of 1-5.

Further, preferably employed are, for example, benzophenones such as benzophenone itself, hydroxybenzophenone, bis-N,N-dimethylaminobenzophenone, bis-N,N-diethylaminobenzophenone, and 4-methoxy-4'-dimethylaminobenzophenone; thioxanthones such as thioxthantone, 2,4-diethylthioxthantone, isopropylthioxthantone, chlorothioxthantone and isopropoxychlorothioxthantone; anthraquinones such as ethylanthraquinone, benzanthraquinone, aminoanthraquinone and chloroanthraquinone; acetophenones; benzoinethers such as benzoinmethylether; 2,4,6-trihalomethyltriazines; 1-hydroxycyclohexyl phenyl ketone; 2,4,5-triarylimidazole dimmers such as a 2-(o-chlorophenyl)-4,5-diphenylimidazole dimer, a 2-(o-chlorophenyl)-4,5-di(m-methoxyphenyl)imidazole dimmer, a 2-(o-fluorophenyl)-4,5-diphenylimidazole dimer, a 2-(o-methoxyphenyl)-4,5-diphenyimidazole dimer, a 2-(p-methoxyphenyl)-4,5-diphenyimidazole dimer, a 2-di(p-methoxyphenyl)-5-phenyimidazole dimer, a 2-(2,4-dimethoxyphenyl)-4,5-diphenyimidazole dimer; benzyldimethy ketal, 2-benzyl-2-dimethylamino-1-(4-morphorinophenyl)-butane-1-one; 2-methyl-1-[4-(methylthio) phenyl]-2-morphorino-1-propanone; 2-hydroxy-2-methyl-1-phenyl-propane-1-one; 1-[4-(2-hydroxyethoxy)-phenyl]-2-hydroxy-2-methyl-1-propane-1-one; phenanthrenquinone; 9,10-phenanthrenequinone; benzoins such as methylbenzoin and ethylbenzoin; acrydine derivatives such as 9-phenylacrydine and 1,7-bis(9,9'-acrydinyl)heptane; bisacylphosphine oxide, and mixtures thereof; which may be employed alone or in combinations.

An accelerator may be added as well as these initiators. Examples thereof include p-dimethylamino ethylbenzoate, p-dimethylamino isoamylbenzoate, ethanolamine, diethanolamine and triethanolamine.

These photopolymerization initiators may be grafted to the side chains of the hydrophilic main chain.

Active Energy Rays and Irradiation Method Thereof

Active energy rays of this invention include, for example, electron rays, ultraviolet rays, alpha rays, beta rays, gamma rays and X-rays, and preferably utilized are electron rays and ultraviolet rays which exhibit minor adverse effects on the human body and ease of handling, as well as prevailing in industrial applications.

In the case of employing electron rays, the irradiation amount of electron rays is preferably adjusted to be approximately in the range of about 0.1-30 Mrad. By setting it to less than 0.1 Mrad, a sufficient irradiation effect can be obtained, and by setting it to more than 30 Mrad, it is likely to deteriorate the support, which is of course not desirable.

In the case of employing ultraviolet rays as a light source, employed may be those common in the art, such as a low pressure, medium pressure or high pressure mercury lamps and a metal halide lamp, operate at a pressure of 0.1 kPa-1 MPa, a xenon lamp of an emission wavelength in the ultraviolet region, a cold-cathode tube, a hot-cathode tube, and LEDs.

Light Irradiation Conditions after Ink Deposition

As active ray irradiation conditions, preferred is to irradiate active rays 0.001-1.0 second after ink deposition, but more preferred is 0.001-0.5 second. It is specifically important that the irradiation initiation is as soon as possible in order to obtain high resolution images.

Lamp Installation

As an irradiation method of active rays, a basic method is disclosed in JP-A 132767. Based on this document, light sources are provided at both sides of a head unit, and the head and the light sources are scanned in a shuttling method. Radiation is performed at predetermined intervals after ink deposition. Further, curing is completed by another light source using no additional driving energy. In U.S. Pat. No. 6,145,979, disclosed is a radiation method employing optical fibers, and a method radiating ultraviolet rays onto a recording area in which collimated light sources are targeted onto mirror surfaces arranged on the sides of the head unit. In the ink-jet image forming method of this invention, any of the foregoing radiation methods may be employed.

Further, one of the preferable embodiments is also to separate active ray irradiation into two steps, in which firstly active rays are initially irradiated 0.001-2.0 seconds after ink deposition with any of the foregoing methods and then active rays are irradiated. By separating active ray irradiation into two steps, it becomes possible to reduce shrinking of the recording medium during ink curing.

Fixing by Heating

In the textile printing method of this invention, after the printing process and active energy ray irradiation process, a heating fixing process may be employed to enhance fixibility of the fabric and employed pigment. Various heating methods may be employed, for example, (1) a method of heating a fabric with a heater installed in the interior of the recording medium conveying rollers of the recording apparatus; (2) a method of installing a fixed platen incorporating a heater, being between the recording medium conveying roller of a recording apparatus and the fabric; (3) a method of heating by irradiation with a heat source lamp onto the printed surface after recording, which lamp is installed adjacent to the recording head; (4) a method of heating the fabric with a heater after recording; and these methods may be employed singly or in combinations.

Pigment

As a pigment employable in this invention, organic and inorganic pigments common in the art may be employed, but preferable is an anionic pigment. Listed are, for example, organic pigments of azo pigments such as: an azo lake, insoluble azo pigment, condensand chelate azo pigment; polycyclic pigments such as a phthalocyanine pigment, perylene and perylene pigment, anthraquinone pigment, dioxanedine pigment, thioindigo pigment, isoindolinone pigment, and quinophthaloni pigment; dye lakes such as an acid dye type lake; nitro pigments; nitroso pigments; aniline black; and day-light fluorescent pigments; as well as inorganic pigments such as carbon black.

Specific organic pigments are exemplified below.

As magenta or red pigments, listed are: C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48: 1, C. I. Pigment Red 57: 1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, and C. I. Pigment Red 222.

As orange or yellow pigments, listed are: C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, and C. I. Pigment Yellow 138.

As green or cyan pigments, listed are: C. I. Pigment Blue 15, C. I. Pigment Blue 15: 2, C. I. Pigment Blue 15: 3, C. I. Pigment Blue 16, C. I. Pigment Blue 60, and C. I. Pigment Green 7.

In dispersion methods of pigments, employed may be various dispersion machines such as a ball mill, a sand mill, an attriter, a roll mill, an agitator, a Henschel mixer, a colloid mill, an ultrasonic homogenizer, a pearl mill, a wet jet mill, or a paint shaker. Further, it is preferable to employ a centrifugal separator and a filter to remove coarse-grained solids in the pigment dispersion solution.

In the ink of this invention, preferred is a self-dispersion type pigment the surface of which is subjected to adhere a polar group such as a sulfonic acid group and a carboxylic acid group, or a pigment dispersed with a polymer dispersing agent.

The polymer dispersing agent of this invention is not specifically limited, and a water-soluble resin or a non-water-soluble resin may be employed. These resins include, for example, a polymer consisting of an individual monomer selected from an individual monomerstyrene, styrene derivatives, vinylnaphthalene derivatives, acrylic acid, acrylic acid derivatives, mathacrylic acid, methacrylic acid derivatives, maleic acid, maleic acid derivatives, itaconic acid, itaconic acid derivatives, fumaric acid, fumaric acid derivatives, a copolymer consisting of more than two monomers, or salts thereof. Further, employed may be water-soluble polymers such as polyvinyl alcohol, polyvinyl pyrrolidone, cellulose derivatives, gelatin, and poltethylene glycol.

The content of these water-soluble resins based on the total ink weight is preferably 0.1-10 weight %, but more preferably 0.3-5 weight %. Further, these water-soluble resins may be employed in combinations of more than two kinds.

The average particle diameter of the dispersed pigments employed for ink-jet ink of this invention is preferably not more than 500 nm, and more preferably not more than 200 nm, and further, preferably not less than 10 nm and not more than 200 nm, more preferably not less than 10 nm and not more than 150 nm. In cases when the average particle diameter of the dispersed pigments exceeds 500 nm, dispersion becomes unstable, and when it is less than 10 nm, stability of the pigment dispersion becomes too low, and ink storage stability tends to deteriorate.

A particle diameter measurement of the pigment dispersion can be conducted by a commercially available particle diameter measuring apparatus employing a light scattering method, an electrophoresis method, or a laser Doppler method. Further, particle image exposure with a transmission electron microscope of at least 100 particles was conducted, and the thus obtained images were statistically manipulated using an image analysis software such as Image-Pro (produced by Media Cybernetics, Inc.), whereby the average particle diameter was determined.

Water-Soluble Solvent

As a solvent of this invention, an aqueous liquid medium is preferably employed, but a mixed solvent of water and water-soluble organic solvent is more preferable. Examples of preferably employed water-soluble organic solvents include alcohols (such as methanol, ethanol, propanol, isopropanol, butanol, isobutanol, secondary butanol, and tertiary butanol); polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerine, hexanetriol and thiodiglycol); polyhydric alcohol ethers (such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether); amines (such as ethanolamine, diethanol amine, triethanolamine, N-methyldiethanol amine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine; amides (such as formamide, N,N-dimethylformamide and N,N-dimethylacetoamide); heterocyclic compounds (such as 2-pyrrolidone, N-methyl-2-pyrrolidone, cyclohexyl pyrrolidone, 2-oxazolidone and 1,3-dimethyl-2-imidazolidinone); and sulfoxides (such as dimethylsuofoxide).

Surface Active Agent

As a surface active agent preferably employed in this invention, listed are anionic surface active agents such as an alkyl sulfate, an alkyl ester sulfate, dialkylsulfosuccinates, alkylnaphthalenesulfonates, an alkylphosphate, a polyoxyalkylene alkyl ether phosphate, and fatty acid salts; nonionic surface active agents such as polyoxyethylene alkyl ethers, polyoxyalkylene alkylphenyl ethers, acetylene glycols, and polyoxyethylene-polyoxypropylene block copolymers; as well as surface active agents such as glycerin esters, sorbitan ester, polyoxyethylene fatty acid amide, and amine oxides; as well as cationic surface active agents such as alkylamine salts and quaternary ammonium salts. These surface active agents may also be employed as dispersing agents of a pigment, of which particularly preferably employed are anionic and nonionic surface active agents.

Various Additives

In this invention, in addition to the above, various additives well-known in the art may be incorporated, for example, a fluorescent brightening agent, an anti-foaming agent, a lubricant agent, an antiseptic agent, a viscosity increasing agent, an antistatic agent, a matting agent, a water-soluble polyvalent metal salt, an acid base, a pH adjusting agent such as a buffering solution, an antioxidizing agent, a surface tension adjusting agent, a specific resistance adjusting agent, a rust-preventing agent, and an inorganic pigment.

Fabric

Media composed of fabric employed in ink-jet textile printing of this invention may contain fibers which can be dyed with a pigment incorporated in an ink, listed examples, of which are natural fibers such as cotton, silk, hemp, and sheep wool; and also ones containing regenerated·semisynthetic fibers such as rayon and acetate. The above fibers may be used alone or in combinations of more than two fibers as a blended fabric, a commingled fabric, and a combined weave. As a fabric, employed may be any configuration of woven, knitted, or nonwoven cloth.

In ink-jet textile printing of this invention, a contact angle of the pigment ink for a fabric is preferably 40-100 degrees. In cases when the contact angle is more than 40°, bleeding and color bleeding are exhibited at in desirable levels. Further, when the contact angle is less than 100°, ink penetration into a fabric is acceptably fast and drying is also good.

Here, "a contact angle of the pigment ink for a fabric" is a value of the contact angle after 0.2 second of ejecting a 2 μl drop of a pigment ink onto a fabric under the conditions of 23° C. and 50% RH. Measurement is conducted employing an automated contact angle meter (Model CA-VP, manufactured by Kyowa Interface Science Co., Ltd.).

Contact angles are determined by viscosity, surface tension and liquid compositions of the ink. As a specific means to adjust the contact angle within the above range, viscosity is preferably not less than 2 mPa·s and not more than 20 mPa·s, and surface tension is preferably not less than 20 mN/m and not more than 50 mN/m.

To adjust these values, listed are kinds of solvents, mixing ratios of water and a water-soluble organic solvent, as well as kinds and content of the surface active agent. Water is preferably 30-80% based on the total ink weight, and the water-soluble solvent is preferably 20-60% based on the total ink weight. Further, the surface active agent is preferably 0.05-2.0% based on the total ink weight.

EXAMPLE

In the following, the present invention will be described referring to examples, however, this invention is not limited thereto.

Example

Synthesis of Polymer 1

Into a reaction vessel, charged were 1 g of glycidyl methacrylate, 48 g of p-hydroxybenzaldehyde, 2 g of pyridine, and 1 g of N-nitroso-phenylhydroxyamine ammonium salt, after which the vessel was placed in a hot-water bath and stirred for 8 hours at 80° C.

Subsequently, 45 g of saponified polyvinyl acetate exhibiting a polymerization degree of 300 and a saponification rate of 88% was dispersed in 225 g of ion-exchanged water, after which, to this solution were added 4.5 g of phosphoric acid and p-(3-methacryloxy-2-hydroxypropyloxy)benzaldehyde obtained by the above reaction until the modification rate to PVA become 3 mol %, while stirring for 6 hours at 90° C. After the obtained solution was cooled to room temperature, 30 g of a basic ion-exchanged resin was added, and further stirred for one more hour. After that, the ion-exchanged resin was filtered, and then, to this filtrate, which resulted in 15% aqueous solution of Polymer 1, added was IRGACURE® 2959 (produced by Ciba Specialty Chemicals, Inc.) at a ratio of 0.1 g per 100 g of the 15% aqueous solution as a photopolymerization initiator, after which the resultant solution was diluted with ion-exchanged water to obtain a 10% aqueous solution of Polymer 1.

Synthesis of Polymer 2

Polymer 2 was synthesized in the same manner as Polymer 1, except that the modification rate was changed to 0.5% by a change of the charging amount of P-(3-methacryloxy-2-hydroxypropyloxy)benzaldehyde.

Synthesis of Polymer 3

Polymer 3 was synthesized in the same manner as Polymer 1, except that the saponified polyvinyl acetate was replaced with saponified polyvinyl acetate exhibiting a polymerization degree of 1,000 and a saponification rate of 88%, and the modification rate was changed to 4.5% by a change of the charging amount of P-(3-methacryloxy-2-hydroxypropyloxy)benzaldehyde.

Preparation of Pigment Dispersion Solutions

Preparation of Magenta Pigment Dispersion Solution

The following additives were mixed, and then dispersed employing a sand grinder filled with 0.5 mm zirconia beads at a volume ratio of 50%, to obtain a Magenta Pigment Dispersion Solution at a content of 10% magenta pigment. The average particle diameter of the magenta pigment particles contained in this Magenta Pigment Dispersion Solution was 83 nm. The particle diameter measurement was conducted with Zetasizer 1000HS, manufactured by Malvern Instruments Co., Ltd.

| | |
|---|---|
| C.I. Pigment Red 122 | 10 parts |
| Joncryl 61 (being an acrylic styrene resin dispersing agent, produced by BASF Japan Ltd.) | 3 parts |
| Glycerine | 15 parts |
| Ion-exchanged water | 72 parts |

Preparation of Black Pigment Dispersion Solution

Carbon black self-dispersion of Cabo-jet 300, manufactured by Cabot Corp., was diluted with ion-exchanged water to prepare a Black Pigment Dispersion Solution at a content of 10% carbon black. The average particle diameter of carbon black particles contained in obtained Black Pigment Dispersion Solution was 153 nm. The particle diameter measurement was conducted with Zetasizer 1000HS, manufactured by Malvern Instruments Co., Ltd.

| Preparation of Ink Set 1 Inks and Ink Set 1 were prepared as described below. | |
|---|---|
| Magenta Pigment Dispersion Solution | 30 parts |
| 10% aqueous solution of Polymer 1 | 30 parts |
| glycerine | 7 parts |
| diethylene glycol | 15 parts |
| diethylene glycol monobutyl ether | 2 parts |
| Olfine 1010 (produced by Nissin Chemical Industry Co., Ltd.) | 0.2 part |

To the above, ion-exchanged water was added to bring the total volume to 100 parts, to obtain Magenta Pigment Ink.

Black Pigment Ink was obtained in the same manner as Magenta Pigment Ink, except Black Pigment Dispersion Solution was employed instead of Magenta Pigment Dispersion Solution.

Ink Set 1 was prepared in combination with Magenta Pigment Ink and Black Pigment Ink, each prepared as above.

Ink Sets 2-5 were prepared in the same manner as Ink Set 1, except that 10% Polymer 1 was replaced with compounds described in following Table 1.

Preparation of Ink Set 6

As follows, solvent-base active energy ray curable inks were prepared, and Ink Set 6 was prepared employing these inks.

| Preparation of Magenta Ink 6 | |
|---|---|
| C.I. Pigment Red 122 | 10 parts |
| Ajisper PB821 (produced by Ajinomoto-Fine-Techno Co., Inc.) | 3 parts |
| Aronix M5700 (produced by Toagosei Co., Ltd.) | 7 parts |
| Ethylene oxide addition 1,6-hexanediol acrylate | 72 parts |
| 3-methoxybuthyl acrylate | 8 parts |
| IRGACURE ® 369 (produced by Ciba Specialty Chemicals, Inc.) | 5 parts |

After mixing and stirring the above compositions, the resulted solution was filtered with a filter, to prepare an active ray curable ink of Magenta Ink 6. Ethylene oxide addition 1,6-hezanediol acrylate employed as above was a nonaqueous system acryl UV monomer.

| Preparation of Black Ink 6 | |
|---|---|
| Carbon black (being MA-7, produced by Mitsubishi Chemical Corp.) | 10 parts |
| Ajisper PB821 (produced by Ajinomoto-Fine-Techno Co., Ltd.) | 3 parts |
| Acronix M5700 (produced by Toagosei Co., Ltd.) | 7 parts |
| Ethylene oxide addition 1,6-hexanediol acrylate | 72 parts |
| 3-methoxybuthyl acrylate | 8 parts |
| IRGACURE ® 369 (produced by Ciba Specialty Chemicals, Inc.) | 5 parts |

After mixing and stirring the above compositions, the resulted solution was filtered with a filter, to prepare an active ray curable ink of Black Ink 6. Ethylene oxide addition 1,6-hezanediol acrylate employed above was a nonaqueous system acryl UV monomer.

Preparation and Evaluation of Printed Image

Employing the above Ink Sets 1-6, printing onto fabrics was conducted employing an ink-jet printer (being Nassenger KS-1600II, manufactured by Konica Corp.). The fabric was plain 100% cotton, and employed in remaining untreated.

The contact angles of the ink and the fabrics are listed in Table 2. The value of the contact angle was one which was determined by dripping the pigment ink drops of 2 μl onto the fabric and measured after 0.2 second of dripping under environmental conditions of 23° C. and 50% RH. The measurement was conducted employing an automated contact angle meter (being Model CA-VP, manufactured by Kyowa Interface Science Co., Ltd.). The contact angle of each Ink was determined employing the fabric of a plain mercerized 100% cotton fabric (being untreated).

The machine was designed to enable continuous ejection of each ink and to affect irradiation employing a 120 W/cm metal halide lamp (being MAL 400 NL at a light source power of 3 kW·hr, manufactured by Japan Storage Battery Co., Ltd.) 0.1 second after the ink deposition.

After that, the printed material was heat-fixed at 120° C. with a common iron.

Evaluation of Line Bleeding Resistance

Thin black lines of 1 mm width and 5 cm length were printed, and visually observed and evaluated based on the following criteria.
- A: The thin line was reproduced as it was without widening due to bleeding.
- B: The line grew slightly wider due bleeding.
- C: The thin line much grew wider due to bleeding and could not be reproduced.

Evaluation of Color Bleeding Resistance

After printing 1 mm black thin lines onto a solid magenta image, visual evaluation was conducted to evaluate color bleeding resistance based on the following criteria.
- A: The border of the thin line and the solid image was sharp.
- B: At the border, apparent bleeding was noted, and the width of the line was increased at more than a factor of 1.5.
- C: The border of the thin line and the solid image was not sharp, and bleeding resistance was extremely poor.

Image Density 10 cm×10 cm black solid images were printed, and the black density of them was measured employing an X-Rite densitometer, and evaluated based on the following criteria.
- A: Black density was at a level of 1.5 or more.
- B: Black density was at level at or between 1.0-1.5.
- C: Black density was at a level of less than 1.0.

Texture of Fabric

The above fabrics were evaluated by rubbing the black solid image printed portion and non-printed portion at the same time, whereby texture was evaluated.
- A: No uncomfortable feeling between the printed portion and the non-printed portion was noted.
- B: Slight stiffness was noted on the printed portion.
- C: The printed portion was raised, and definite stiffness was felt.

The results are shown in Table 1.

TABLE 2

| Ink Set No. | Polymerizable Compound | Color | Contact Angle (degree) | Remarks |
|---|---|---|---|---|
| 1 | Polymer 1 | Magenta | 56 | This invention |
| 1 | Polymer 1 | Black | 78 | This invention |
| 2 | Polymer 2 | Magenta | 52 | This invention |
| 2 | Polymer 2 | Black | 73 | This invention |
| 3 | Polymer 3 | Magenta | 60 | This invention |
| 3 | Polymer 3 | Black | 85 | This invention |
| 4 | None | Magenta | 58 | Comparative example |
| 4 | None | Black | 80 | Comparative example |
| 5 | Thermoplastic Resin Microparticle* | Magenta | 38 | Comparative example |
| 5 | Thermoplastic Resin Microparticle* | Black | 47 | Comparative example |
| 6 | Acryl UV Curing Compound | Magenta | 35 | Comparative example |
| 6 | Acryl UV Curing Compound | Black | 38 | Comparative example |

From Table 1, it is proved that bleeding and color bleeding are prevented and higher density is obtained when the ink set, which contains polymers of this invention, is employed.

What is claimed is:

1. A method for ink-jet textile printing comprising the steps of:
(a) ejecting a pigment ink from a recording head onto a fabric, wherein the pigment ink contains at least water, a pigment and a polymer, wherein the polymer has a plurality of side chains in a hydrophilic main chain and is capable of cross-linking between the side chains by irradiation of active energy rays, the hydrophilic main chain of the polymer being a saponified polyvinyl acetate which exhibits a polymerization degree of not less than 200 and not more than 2,000, wherein the polymer contains a unit of formula (5), and

TABLE 1

| Ink Set No. | Polymerizable Compound | Polymerization degree | Modification rate (mol %) | Bleeding | Color Bleeding | Density | Texture | Remarks |
|---|---|---|---|---|---|---|---|---|
| 1 | Polymer Compound 1 | 300 | 3.0 | A | A | A | A | Inv. |
| 2 | Polymer Compound 2 | 300 | 0.5 | A | B | A | A | Inv. |
| 3 | Polymer Compound 3 | 1000 | 4.5 | A | B | A | A | Inv. |
| 4 | None | — | — | C | C | C | A | Comp. |
| 5 | Thermoplastic Resin Microparticle* | — | — | C | C | B | B | Comp. |
| 6 | Acryl UV Curing Compound | — | — | C | C | B | C | Comp. |

*10% dispersion of a styrene acryl compound (exhibiting a Tg of 10° C. and an average particle diameter of 120 nm)
Inv.: This invention,
Comp.: Comparative example (b) forming an image by irradiation of active energy rays onto the ink ejected areas

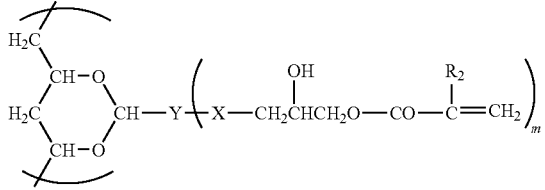

Formula (5)

in the formula, $R_2$ is methyl group or hydrogen, n is 1 or 2, X is $-(CH_2)_m-COO-$, $-CH_2-COO-$, or $-O-$, Y is an aromatic ring or a single bond, and m is an integer of 0-6.

2. The method for ink-jet textile printing of claim 1, wherein the fabric is not conducted with pretreatment.

3. The method for ink-jet textile printing of claim 1, wherein an amount of the unit of Formula (5) in the polymer, is not less than 0.3 mol % and not more than 4 mol %.

4. The method for ink-jet textile printing of claim 1, wherein a contact angle of the pigment ink and the fabric is 40 to 100 degrees.

5. The method for ink-jet textile printing of claim 1, wherein the pigment ink further comprises a photopolymerization initiator in an amount of not less than 0.1 weight % and not more than 1.0 weight % based on the total ink weight.

6. The method for ink-let textile printing of claim 1, wherein ultraviolet rays are irradiated after the pigment ink is adhered onto the fabric.

7. The method for ink-jet textile printing of claim 1, wherein a heat-fixing process is conducted after the pigment ink is adhered onto the fabric.

* * * * *